Figure 1:
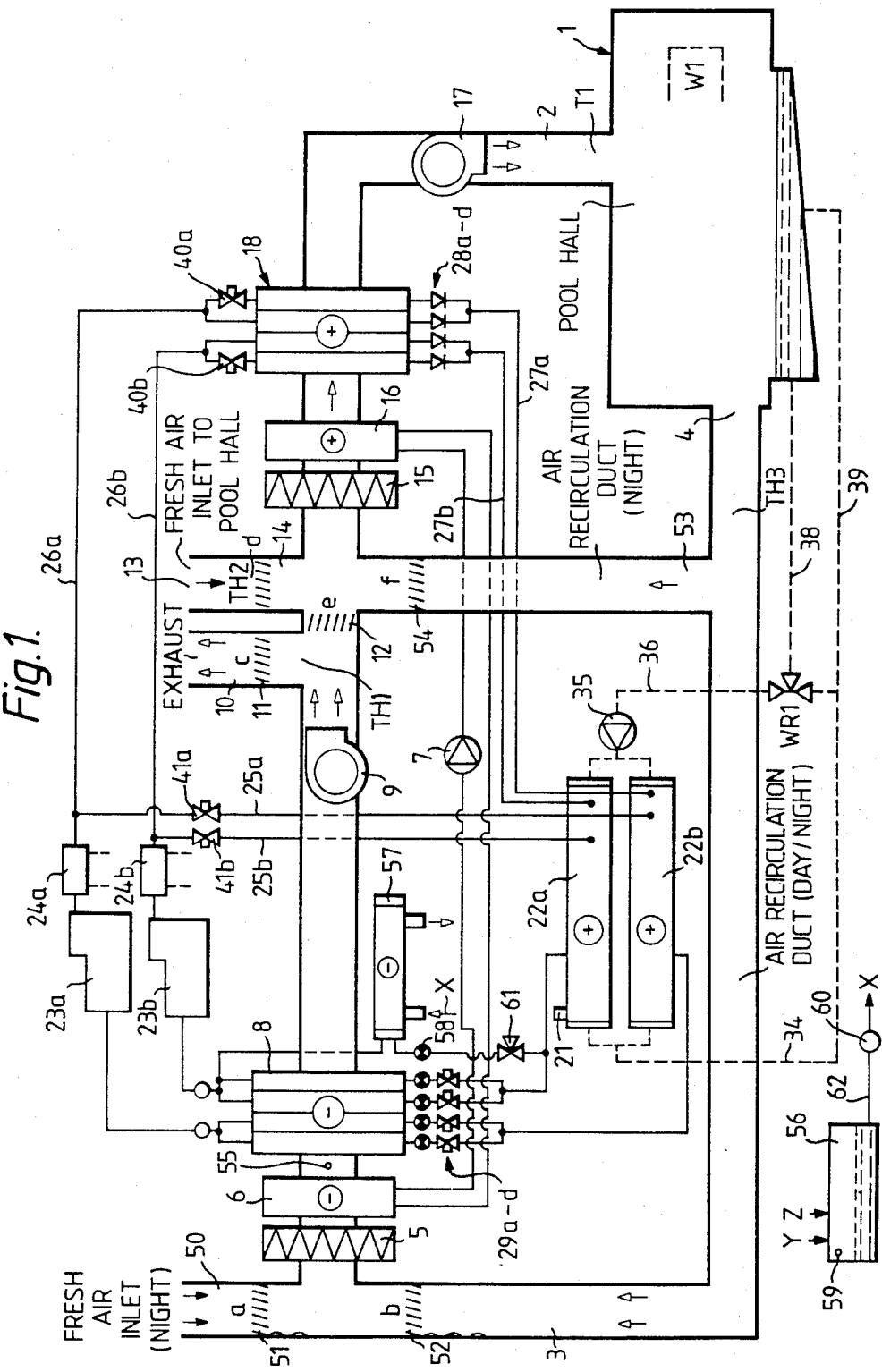

United States Patent [19]

Foley et al.

[11] Patent Number: 4,517,810
[45] Date of Patent: May 21, 1985

[54] ENVIRONMENTAL CONTROL SYSTEM

[75] Inventors: Peter N. Foley, Shoeburyness; Alan M. Turbard, Halstead, both of England

[73] Assignee: Borg-Warner Limited, Hitchin, England

[21] Appl. No.: 562,266

[22] Filed: Dec. 16, 1983

[51] Int. Cl.³ .............................................. F25D 17/04
[52] U.S. Cl. ......................................... 62/186; 62/82; 62/238.6; 237/2 B; 165/16
[58] Field of Search ................... 62/238.6, 80, 79, 90, 62/186, 82; 165/16; 237/2 B

[56] References Cited

U.S. PATENT DOCUMENTS

| | | | |
|---|---|---|---|
| 3,916,644 | 11/1975 | Nasser | 62/90 X |
| 4,407,185 | 10/1983 | Haines et al. | 165/16 X |
| 4,409,796 | 10/1983 | Fisher | 62/238.7 X |
| 4,414,818 | 11/1983 | Tubard et al. | 62/176.1 |

FOREIGN PATENT DOCUMENTS

| | | | |
|---|---|---|---|
| 57-47139 | 3/1982 | Japan | 62/238.7 |
| 591819 | 8/1947 | United Kingdom . | |
| 591469 | 8/1947 | United Kingdom . | |
| 1532481 | 11/1978 | United Kingdom . | |
| 2073392 | 10/1981 | United Kingdom . | |
| 2087530 | 5/1982 | United Kingdom . | |

Primary Examiner—William E. Wayner
Assistant Examiner—John Sollecito
Attorney, Agent, or Firm—Thomas B. Hunter

[57] ABSTRACT

An environmental control system for controlling the environmental conditions in a swimming pool hall 1 comprises a heat pump having a multi-section evaporator 8, compressors 23a and 23b and a multi-section condensor 18.

In the day-time, the dry bulb temperature in the pool hall is maintained by circulating space air through a duct 3 to the evaporator 8 where the latent heat is recovered from the moisture laden air. This heat is rejected via the condensor 18 either to the now drier recirculated air or fresh air from an inlet 13 or a mixture of air from the two sources. In a night mode of operation, circulation of space air through the duct 3 is prevented and instead it is recirculated via a direct recirculation duct 53 and is heated by the condensor 18, the heat used to do this being recovered from outside air inducted into the evaporator 8 via an inlet 50. In order to prevent frosting of the evaporator when the outside air temperature is too low, a damper 52 may be opened to allow some space air to pass through the evaporator 8 and raise its temperature. In order to increase the heat recovery capability of the compressor, storage tank 56 is used to collect waste water from showers etc. and also from backwash through the pool water filter and when this tank is full, its water is chilled by means of a water chiller 15 in parallel with the evaporator and the heat so recovered is rejected to the re-circulating space air by means of the condensor 18.

8 Claims, 2 Drawing Figures

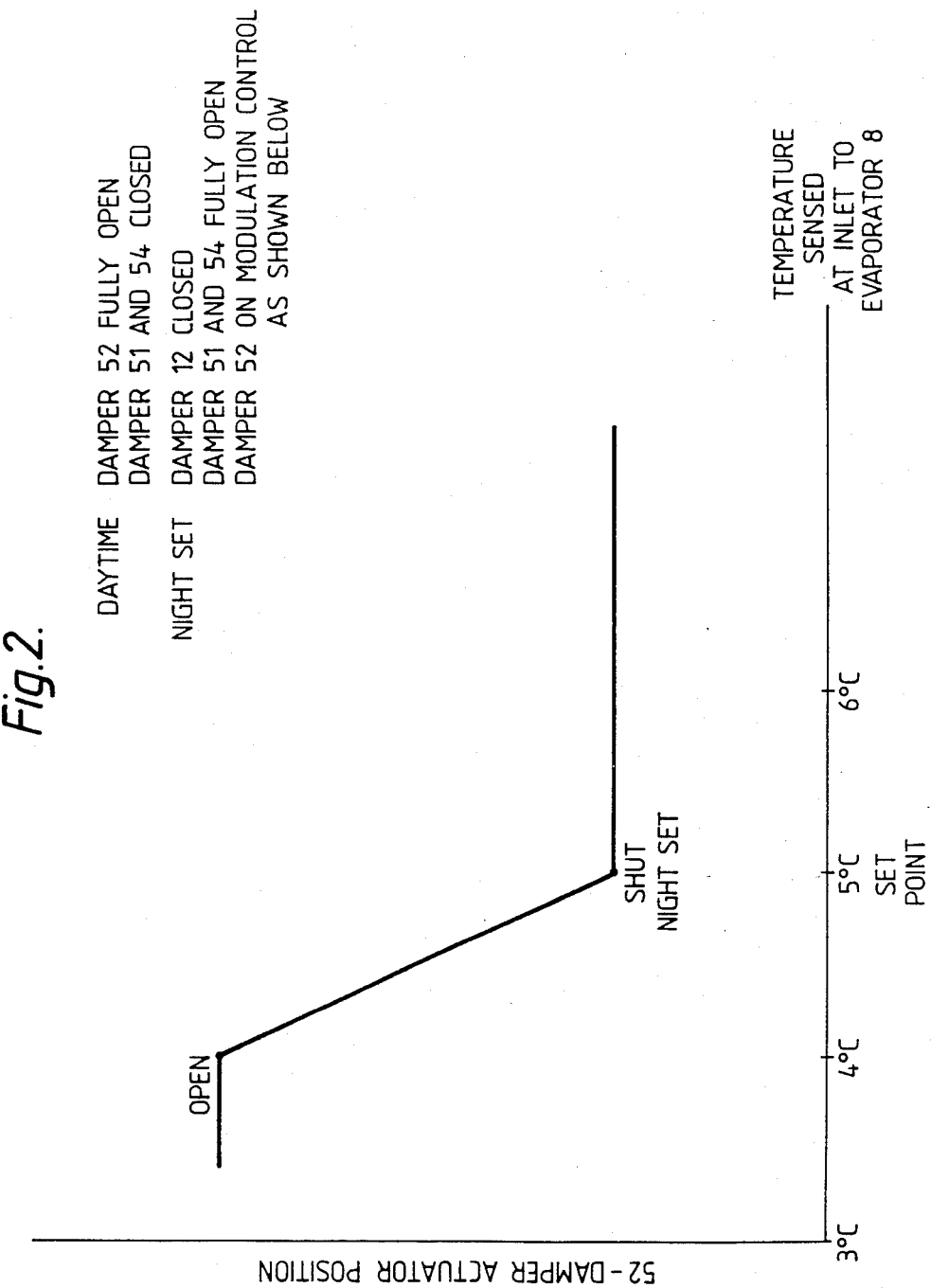

ENVIRONMENTAL CONTROL SYSTEM

BACKGROUND OF THE INVENTION

The present invention relates to an improved environmental control system.

In some types of environmental control system incorporating a heat pump, it may be desirable to recover heat from air from one source and to reject this heat to the space air whose environmental conditions are to be controlled. One source of air which may be suitable under certain circumstances is outside air but this can give rise to a problem which also arises in other applications where the air temperature in an evaporator may fall towards zero degrees C°. In those circumstances, frosting may occur and this will drastically reduce the efficiency of the heat transfer from the air to the refrigerant in the evaporator. There have been various proposals for reducing this frosting, for example, so-called "hot gas defrost", electric heat defrost and "reversed cycle defrost". However the previously proposed means tend to involve relatively high energy consumptions.

In some environmental control systems, provision is made for space air to be re-circulated after it has been conditioned, inter alia, by the heat pump. One aspect of the present invention is concerned with providing a means whereby in such an environmental control system, advantage can be taken of the fact that space air can be recirculated to avoid the evaporator air temperature dropping sufficiently for frosting to occur. More particularly this aspect of the present invention is concerned with an environmental control system in which heat can also be recovered from an alternative source which is liable under certain circumstances to produce an evaporator air temperature which is sufficiently low for frosting to occur and provides that in such circumstances space air is re-circulated through the evaporator to maintain it at an adequate temperature, such that frost formation is inhibited.

Thus according to the first aspect of the present invention there is provided an environmental control system for controlling the condition of a space, including: a heat pump arrangement comprising an evaporator for recovering sensible and latent heat from air delivered thereto, a condensor for rejecting heat recovered by the evaporator to air to be delivered to the space; and means for delivering air from a selected source to the evaporator, the means being arranged so as, in one mode of operation, to deliver outside air to the evaporator and so that in the event of the evaporator air temperature falling to a level which could result in frosting of the evaporator, air re-circulated from the space is delivered to the evaporator to maintain the air temperature above that level.

One important area of application of the present invention is to the environmental control of swimming pool halls. In such applications, there is an important source of heat available for conditioning the space air, namely the latent heat of moisture contained in the space air. By having the space air passed through an evaporator where it is cooled sufficiently for the moisture to condense, the heat recovered can then be rejected either to the dehumidified space air or to incoming outside air or to a mixture of the two so as to provide an inflow into the swimming pool hall of heated, dryer air.

In order to maintain the environmental conditions at night, when the rate of evaporation of water from the pool is low, it is possible to use the evaporator to recover heat from the outside air, this heat then being rejected to the space air. This is, of course, the situation in such an application where the possibility of frosting of the evaporator occurs. The second aspect of this invention is concerned with the situation where in normal circumstances one would wish to recover heat from the ambient air, for example during the night mode of operation of the swimming pool environmental control system, and where the risk of evaporator frosting would occur. It seeks to use an alternative source of heat, when available, for heat recovery so that the heat recovery load on the compressor is increased. In the swimming pool application, an important source of heat is waste water from showers, wash basins etc and also the waste water which is produced during backwash, i.e. the reverse-flushing of the pool water filters which is carried out periodically. While this waste water might not be considered a major potential source of heat in ordinary circumstances, nevertheless it can provide a valuable source of heat to aleviate the heating demand on the evaporator during night operation. Thus in general terms, this aspect of the present invention provides for the recovery of heat from the waste water to enable the evaporator load to the compressor to be increased.

Thus according to a second aspect of the invention, there is provided an environmental control system for controlling the condition of a space, including a heat pump arrangement comprising an evaporator for recovering heat from air delivered thereto, a waste water store, means for recovering heat from waste water in said store, a condensor for rejecting heat recovered by the evaporator and the heat recovering means to air to be delivered to the space, the heat pump arrangement being operable in a mode in the normal course of which heat is recovered from air by the evaporator and being arranged so that when operating in that mode, at least when the air temperature is low enough for frosting of the evaporator to occur, heat is preferentially recovered from the waste water so as to increase the heat recover load on the compressor.

As will become apparent from the following description, both aspects of the present invention may be embodied in a single environmental control system used, for example, in controlling the environmental conditions of a swimming pool. The following description will be given in terms of the application of the invention to the swimming pool environment but it will be appreciated that the various techniques and features proposed could be used in a similar, analogous fashion in other applications.

Preferably the environmental control system incorporates a re-circulation duct for delivering space air to the evaporator, for delivering air from the evaporator to the condensor, and for delivering air from the condensor to the space. The means, in the first aspect of the invention, for selectively delivering air to the evaporator may then be associated with the re-circulation duct upstream of the evaporator and comprise an outside air inlet and control vanes for controlling the ratio of outside air and space air into the evaporator. During normal day-time operation, the air which passes through the evaporator is from the swimming pool hall and has the latent heat content recovered by the evaporator and this heat is then rejected to air entering the swimming pool hall by the condensor. The air heated by the condensor may be either the air from the evaporator or outside air or a mixture of the two and preferably the control circuitry of the system is arranged so that the source of air selected for heating by the condensor is the one having the higher enthalpy value. During normal night mode operation, when the rate of evaporation of water in the pool hall is very much lower, the evaporator can use the outside air is its prime source of heat to maintain a desired set point temperature in the pool hall; this night-time demand temperature may be selected somewhat less than the day-time one. According to the first aspect of the invention, when the ambient air temperature falls to a level where frosting of the evaporator should occur, a quanity of space air is allowed to re-circulate through the evaporator to maintain its temperature above the frosting threshold.

During day-time operation, if the heat recovered by the evaporator exceeds the heating demand for heating air entering the hall, the excess heat may be dumped into the pool water to raise its temperature although the system controller will define a maximum permitted water temperature to prevent a runaway situation occurring because the evaportion rate increases with the pool temperature rise and it is undesirable to let the water temperature exceed the hall air temperature. It is normal to use a removable cover on the pool when not in use to cut the rate of evaporation.

Downstream of the evaporator there may be provided an exhaust outlet for exhausting air from the evaporator to the outside, an inlet for outside air and control vanes for controlling the passage of air from the evaporator to the exhaust outlet and/or to the condensor and the passage of air from the outside air inlet to the condensor. These control vanes may be used to select the air source used to supply the evaporator. Additionally, for operation in the night mode, a direct re-circulation duct may be provided for re-circulating space air directly from the space to the condensor for heating and thence back to the space, the flow of air through the direct re-circulation duct being prevented during normal day-time operation.

The invention will be further described by way of example with reference to the accompanying drawings in which:

FIG. 1 is a somewhat schematic diagram showing a swimming pool environmental control system embodying the present invention; and FIG. 2 is a chart showing the programmed response of the system dampers.

The environmental control system in accordance with the present invention, as illustrated in FIG. 1, is designed as a control system for the air within a swimming pool hall 1.

Air is introduced to the pool hall via an inlet duct 2 and leaves via outlet 4 of an air re-circulation conduit 3 and extracted via fan 9, passes through various elements of the air conditioning means which are effective to ensure that the temperature and humidity of the air arriving at the inlet 2 at the downstream end of the re-circulation conduit 3 are as desired.

The extracted air first passes through a filter 5 and then through a heat-exchanger 6 of a water "run around circuit" into which heat exchange cool water is separately pumped by way of a pump 7, so as to extract heat from the air as it leaves the filter 5; this heat is rejected to the air entering the pool 1 by means of a similar coil 16.

In the main return limb of the re-circulating air conduit 3, the air encounters a multi-section evaporator 8 forming part of a heat pump system to be described further below.

Air from the evaporator 8 either leaves by way of an atmospheric vent 10, after passing through dampers 11, or passes on through a further damper 12 to re-circulate to the pool hall.

Just downstream of damper 12 is a fresh air inlet 13 through which air may be selectively admitted into the re-circulation air conduit 13 by dampers 14.

The air (which during normal day-time operation will usually be a mixture of re-circulated air and ambient fresh air) passes through a further filter 15 and the run-around heating coil 16. Its movement is fan-assisted by means of a second fan 17, which draws it through a condensor 18 of the heat pump system and delivers it via the inlet 2 to the pool hall.

The control of the conditions of the air entering the pool hall through inlet 2 is achieved by way of various sensors:

(a) A temperature sensor T1 at the inlet 2 measures the temperature of the inlet air to ensure that it is below a predetermined maximum value.

(b) The enthalpy of the re-circulating air entering the mixing location (just leaving the first-mentioned fan 9) is measured by means of a first temperature/humidity sensor TH1. A comparative assessment of the enthalpy of the incoming air from the ambient air inlet 13 is made by means of a second temperature/humidity sensor TH2. A suitable controller, not shown, serves to compare the enthalpy values determined by the sensors TH1 and TH2, for a purpose to be described later.

(c) A window sensor W1, sensing the surface temperature of the glass of the pool hall windows or other critical fabric zone, is effective in the humidity control mode to vary the set point of the humidity value to ensure that, as far as possible, the dew point of the air within the pool hall is less than the glass or critical fabric surface temperature thereby avoiding the likelihood of condensation occurring on the windows.

(d) A further temperature/humidity sensor TH3 measures the temperature and the humidity of the air at the outlet 4 from the pool hall, in order to monitor the attainment and maintenance of, on the one hand, the set point air dry bulb temperature and, on the other hand, the set point humidity value of the air within the system.

(e) A pressure sensor 21 serves to measure the pressure of the refrigerant in a condensor receiver 22 of the heat pump system, in order to ensure that the pressure in the condensor can be maintained at an optimum value.

The heat pump system is arranged as two parallel circuits, each comprise sections of the evaporator 8 and condensor 18, respective two stage compressors 23a, 23b desuperheaters 24a and 24b, condensor receivers 22a, 22b. Direct return of the refrigerant in each circuit after the desuperheaters 24a, b to the condensor receiver 18 is possible by way of opening solenoid shut-off valves 41a and 41b in refrigerant lines 25a and 25b, respectively.

The condensor 18 has four sections, two each in the two parallel heat pump circuits. Flow through the sections is controlled by one-way refrigerant non-return control valves 28a-d.

The evaporator 8 is similarly a four section parallel device, with individual control valves 29a-d to switch the respective sections on line.

The four control valves 29a–d control the refrigerant feed to the evaporator and thus control the operating pressure within the evaporator via the thermostatic expansion valves 30a–d. The refrigerant is deliverd to the compressors 23a, b via respective crankcase pressure regulators used to protect the compressors against too high suction pressures.

The desuperheaters 24a, b each comprise a straightforward heat-exchanger to desuperheat the refrigerant leaving the compressor. The heat rejected may be used to heat a limited quantity of hot water for use, for example, directly or indirectly for shower water or other domestic purposes.

DAYTIME OPERATION

As indicated above, during daytime operation the three dampers 11, 12 and 14 are controlled so as to select the desired ratio of re-circulated/fresh air. The dampers themselves are controlled by a control unit which may comprise a particular control loop of the main control unit of the heat pump system, and is responsive to the enthalpy values determined by means of the re-circulated air enthalpy-sensing temperature/humidity sensor TH1 and the fresh air enthalpy-sensing temperature/humidity sensor TH2.

DRY BULB TEMPERATURE MAINTENANCE

When the pool air dry bulb temperature determined by temperature/humidity sensor TH3 is below the set point, the dampers are adjusted so that the air to be delivered to the pool hall is from whichever source, i.e. the outside or the upstream part of the re-circulation duct, has air of the higher enthalpy, whereas when the dry bulb temperature of the air in the pool hall is above the set point, the dampers will select air from the one of the two sources having the lower enthalpy. The operation of the vanes of the damper 12 on the one hand and those of the dampers 11 and 14, on the other, is controlled in a modulated manner in response to the magnitude of the difference between the enthalpy values detected by sensors TH1 and TH2.

The condensor receivers 22a, b in the heat pump system have a pool water circulation circuit 34 by way of a three-way modulatable control vale WR1. Water is pumped around the circuit 34 by means of the pump 35 such that it leaves the condensor receivers 22a, b and is then passed along a conduit 34 to the valve WR1 and line 39 to the pool. Water is extracted from the pool by way of a further line 38.

The valve WR1 is controlled in response to the condensor receiver pressure detected by the pressure sensor 21. The intention is that this sensor 21 should be set at an optimum value and thus, when the sensor 21 rises above its set point, the valve opens. On the other hand, when the pressure detected by sensor 21 falls, the valve WR1 closes. In this way a steady state condition can be attained in which the proportion of the water pumped through the circuit 34 which has come from the pool by way of line 38 can be controlled due to the modulating operation of the valve WR1. In this way, any excess heat extracted from the air in the recirculating conduit 3 (by means of the cooler 8) can be dumped into the pool water. However, if the pool water temperature reaches its maximum design temperature, the heat pump system is controlled such that all stages of the cooler 8 are off and the compressor 23 is de-energised, to prevent further heat dumping, and so avoid too high an evaporation rate of the pool water which would create difficulties.

The water "run around circuit" comprising the first and second heat-exchanger 6 and 16 is in operation whenever the dry bulb temperature of the pool hall is below the set point, as this provides a relatively cheap means of effecting a measure of heat transfer between the warm air leaving the pool hall and the relatively cooler air on its way to the pool hall.

Once the dry bulb temperature has fallen more than 0.5° C. below the set point, the heat pump system is progressively brought on line one section at a time. At first only one stage of one of the compressors 23a, 23b is brought into operation with only one section of the evaporator 8 and condensor 18 in circuit. For larger temperature errors, the second stage of the operating compressor and the condensor and evaporator sections associated with it are first brought into action and then the second compressor is activated, first with one of its stages and the associated evaporator and condensor sections and then, if the temperature error is large enough, with both. The number of evaporator and condensor sections in operation can also be controlled in accordance with the heating demand and heat availability in the air re-circulated from the pool hall.

When the dry bulb temperature is 1.0° C. above the set point, one of the heat pump compressors 23a, b is switched on and one associated section of the evaporator 8 and one section 18a of the heater will be operating and the system dumping heat to the pool water via one of the condensor receivers 22a, b; if the temperature rises further, the vanes 12 are closed slightly and the vanes 11 and 14 are opened slightly so as to increase the fresh air intake in an attempt to depress the dry bulb temperature or in any event to reduce the humidity levels until the fresh air dampers 11 and 14 are fully open and the re-circulating air damper 12 fully closed. If the cooling demand increases further the other condensor receiver 22a, b is brought into operation to dump more heat into the pool water.

If, during the dry bulb temperature excursion, the pool water reaches its maximum design temperature, measured by thermally responsive means (not shown), the heat pump will be switched off in order to prevent further heat from being dumped to the pool water by way of the condensor receiver 22 and the pool water circuit 34.

ENTHALPY COMPARISON CONTROL (DAYTIME)

As explained above, the enthalpy comparison controller simply uses the temperature/humidity sensors TH1 and TH2 to determine the best source of air, i.e. re-circulated air or fresh air, in order to ensure that the minimum energy transfer, and hence the minimum energy consumption, is needed under any particular mode of operation. The comparison of enthalpy is a continuous function and overrides other considerations determining the settings of dampers 11, 12 and 14. It was indicated above, with reference to the dry bulb temperature controlling mode, that the dampers bring in more fresh air if the dry bulb temperature exceeds the set point. It is this aspect of the damper control which may be overridden by the enthalpy comparison control circuit.

The enthalpy comparison control is reverse-acting in that when the system is operating in the heating mode the sensors TH1 and TH2 will select the air mixture (re-circulating air or fresh air or combination of the two) which has the highest enthalpy, whereas in the cooling mode the air mixture with the lowest enthalpy will be selected.

In addition to being programmed to maintain a desired dry bulb air temperature in the pool hall, the system may also be programmed to effect a humidity control to maintain a desired level of humidity in the pool hall and also to carry out refrigerant pressure control of the heat pump system as this has a bearing on the overall efficiency of the system.

POOL BACKWASH AND WASTE WATER HEAT RECOVERY

In addition to using the re-circulated air as a source of heat for maintaining a minimum evaporator coil temperature, an additional source of heat may be utilised. In particular, the pool hall may have associated with it a holding tank 56 which collects waste warm and hot water Y from, for example, showers and/or wash basins and also backwash water Z, this latter being the water which is collected by periodically reverse-flushing the pool water filters to clean them.

When backwash takes place, there is a considerable amount of heat that is conventionally rejected to waste although this occurs over relatively short periods of time and at infrequent intervals. However if this is allied to the waste water resulting from the use of the shower system, wash basins etc, then the overall potential for heat recovery becomes attractive especially in the case of the larger pools using duplex heat pumps.

Thus during the night mode operation, the water from the holding tank 56 is passed to a shell and tube heat exchanger 57 of conventional construction which can be switched into circuit in parallel with two of the sections of the evaporator 8 by means of a control solenoid valve 61. This additional source of heat increases the heat recovery potential by increasing the evaporator load on compressor 23b and thus further reduces the possibility of evaporator 8 frosting up.

Refrigerant heated in the water chiller 57 is is passed to the second compressor 23b for rejection to the re-circulating pool air via the associated sections of the condensor 18.

The holding tank 56 is provided with a water level switch 59 which, via the system controller, controls the operation of the pump 60 which delivers the water from the holding tank to the water chiller 57. At the same time as the pump 60 comes into operation, solenoid valve 29d is closed and solenoid valve 61 opened to allow liquid refrigerant flow into the thermostatic expansion valve 58 on the chiller 57. When the water flow as indicated by a flow switch 62 ceases, then solenoid valves 29d and 61 revert to their previous states and liquid refrigerant flow is redirected back to the air cooled evaporator 8.

NIGHT MODE

At night, the rate of water evaporation from the pool water is at a minimum and this reduces the heat recovery capability from the re-circulated air. In order to maintain the set point temperature, unless measures were taken to avoid it, the system using ambient air as the heat recovery source would tend to depress the evaporator coil temperature to a point where frosting up would start to occur. When an evaporator frosts up, its efficiency is drastically reduced. Furthermore the coefficient of performance (COP) falls as the evaporating temperature reduces. Conventional evaporator defrost techniques tend to have rather high energy consumptions.

In order to avoid the above problem, the system is set up so that recirculated air can be introduced into the inlet duct and used to heat the coils of the evaporator 8. A fresh air inlet 50 is provided through which the ambient air flow can be controlled by means of dampers 51. A damper 52 in the re-circulation duct 3 just upstream of the junction with the fresh air inlet 50 is provided so that the air flow through the re-circulation duct 3 can be controlled during night operation, its modulation being dependent upon the mixed air temperature at the inlet to the evaporator 8.

An air-recirculation duct 53 for use during night mode operation is provided and connects the pool air outlet 4 with the zone of the main re-circulation duct just downstream of the dampers 12 and 14. The air flow through this duct 53 is controlled by means of dampers 54, normally fully open.

The night mode is selected by the system controller at a pre-selected time and for this mode of operation, the damper 54 is opened and the damper 14 is set for minimum fresh air intake through the inlet 13. Damper 12 is closed and damper 11 opened so that air flowing along the section of the re-circulation duct through the evaporator 8 will be exhausted to the outside via the outlet 10.

Damper 51 is modulated open to allow outside air to pass through the evaporator and to be exhausted via the opened damper 11. The run around coil pump 7 is off.

Operating in a dry bulb temperature control mode, heat is recovered from fresh air entering the inlet 50 and passing through the evaporator 8 and this recovered heat is rejected via the condensor 18 to the pool air passing through the re-circulation duct 53.

The temperature of air entering the evaporator 8 is monitored by an averaging type thermostat 55 and if this temperature falls below 5° C, the system controller operates to modulate the damper 53 open so that air can again begin to flow along the re-circulation duct 3 to be mixed with the fresh air entering the inlet 50, thus increasing the heat content of the air entering the evaporator 8. The re-circulated air is thus used to maintain the temperature of the coils of the evaporator 8 above the threshold temperature which frosting would occur. The damper 52 modulates open until the mixed air entering the evaporator coils is raised to approximately 6° C. whereupon it will modulate to maintain this minimum condition.

Thus, by maintaining a minimum air temperature into the evaporator coils, the COP remains within an acceptable range and the heat pump system is maintained in a normal operating mode and is not complicated by any hot gas- or reversed cycle- defrost modes.

The compressors 23a and 23b will operate, progressively loading up in response to the pool hall with sensed dry bulb temperature which is dependent upon the fabric loss.

During night mode operation, the demanded dry bulb temperature in the pool hall 1 may, if desired, be "set back" (reduced) to reduce the heating demand upon the system thus maintaining a minimum energy consumption.

We claim:

1. An environmental control system for controlling the condition of a space, including: a heat pump arrangement comprising an evaporator for recovering heat from air delivered thereto, a condensor for rejecting heat recovered by the evaporator to air to be delivered to the space; and means for delivering air from a selected source to the evaporator means to sense the temperature of said air, and control means, the means being operatively arranged so as, in one mode of operation, to deliver outside air to the evaporator and so that in the event of the evaporator entry air temperature falling to a level which could result in frosting of the evaporator, air re-circulated from the space is delivered to the evaporator to maintain the temperature above that level.

2. A system according to claim 1 for use in an application such as the environmental control of a swimming pool hall, where the latent heat of moisture in the space air is available as a heat source for heat recovery, and which is arranged so that space air may be delivered to the evaporator to recover heat therefrom.

3. A system according to claim 2 wherein a re-circulation duct is provided for delivering space air to the evaporator, air from the evaporator to the condensor, and air from the condensor to the space.

4. A system according to claim 3, wherein said means for selectively delivering air to the evaporator is associated with the re-circulation duct upstream of the evaporator and comprises an outside air inlet and control vanes for controlling the flow of outside air and space air into the evaporator.

5. A system according to claim 4, wherein downstream of the evaporator are an exhaust outlet for exhausting air from the evaporator to the outside, an inlet for outside air and control vanes for controlling the passage of air from the evaporator to the exhaust outlet and/or to the condensor and the passage of air from the outside air inlet to the condensor and operable such that in a second mode of operation, air from the evaporator and/or air from the outside air inlet is delivered to the condensor.

6. A system according to claim 5 wherein the arrangement is such that the air delivered to the condensor is from that one of the two sources, i.e. the evaporator and the outside air, which can provide air of the higher enthalpy.

7. A system according to claim 1 including a direct re-circulation duct for re-circulating space air directly from the space to the condensor for heating and thence back to the space.

8. A system according to claim 7 wherein means are provided for controlling the air flow through the direct re-circulation duct such that air can flow when the system is in the first mentioned mode of operation and so that it cannot when air is being re-circulated via the evaporator.

* * * * *